United States Patent [19]

Harrington

[11] Patent Number: 5,588,093
[45] Date of Patent: Dec. 24, 1996

[54] COLOR MAPPING TO PRESERVE DETAIL

[75] Inventor: Steven J. Harrington, Holley, N.Y.

[73] Assignee: Xerox Corporation, Stamford, Conn.

[21] Appl. No.: 168,444

[22] Filed: Dec. 17, 1993

[51] Int. Cl.$^6$ .................................................. G06K 15/00
[52] U.S. Cl. ........................................ 395/109; 358/518
[58] Field of Search ................................. 395/109, 115, 395/118, 131, 132; 358/515, 518, 532, 512, 517, 520, 532; 382/162, 163, 167, 274, 275

[56] References Cited

U.S. PATENT DOCUMENTS

| | | | |
|---|---|---|---|
| 3,970,825 | 7/1976 | Plockl | 235/467 |
| 5,049,997 | 9/1991 | Arai | 348/364 |
| 5,122,784 | 6/1992 | Canova | 345/155 |
| 5,153,576 | 10/1992 | Harrington | 340/793 |
| 5,237,517 | 8/1993 | Harrington et al. | 364/526 |
| 5,341,464 | 8/1994 | Friedman et al. | 395/131 |
| 5,394,518 | 2/1995 | Friedman et al. | 395/131 |
| 5,398,123 | 3/1995 | Katsuma | 358/518 |
| 5,402,245 | 3/1995 | Motta et al. | 358/523 X |

OTHER PUBLICATIONS

*Color Encoding Standard*, Xerox System Integration Standard, Xerox Corp. Palo Alto, California, Jul. 1991 XNSS 289107 ("The Xerox Color Encoding Standard").

*Primary Examiner*—Edward L. Coles, Sr.
*Assistant Examiner*—Gabriel I. Garcia
*Attorney, Agent, or Firm*—Thomas B. Zell; Duane C. Basch

[57] ABSTRACT

A method and apparatus is disclosed for mapping original colors of image elements forming a color image to colors that appear solid when reproduced on a color printer. The original color and the solid color of each image element may be defined by a subtractive mixture of cyan, magenta and yellow colorants. The method first determines whether the original color of each image element is a light color surrounded by a dark background color, or a dark color surrounded by a light background color. Subsequently, the cyan and magenta colorants of each original color determined to be a light color surrounded by a dark background color are minimized; and one of the cyan or magenta colorants for each color determined to be dark and surrounded by a light background color is maximized. Consequently, image elements having colors defined by the mapping appear solid when reproduced by the color printer.

21 Claims, 4 Drawing Sheets

COLOR MAPPING TO PRESERVE DETAIL

The present application is related to the co-pending U.S. patent application Ser. No. 08/169,878 entitled "Method And Apparatus For Rendering Areas Of An Image With Solid Boundaries", filed concurrently herewith (Attorney Docket No. D/92453).

The present invention relates generally to a color document processing system equipped with user invokable color mapping to preserve detail, and more particularly to a method of mapping colors of an original image to solid colors in order that the detail of the original image is preserved when printed.

BACKGROUND OF THE INVENTION

Color document processing systems typically include an input device such as a computer workstation that is equipped with document applications for creating, editing and storing electronic documents and an output device such as a printing system for rendering documents. The computer workstation is operated by a user to create, edit or view "softcopy" color images on the color monitor of the workstation. The user can subsequently generate "hardcopy" reproductions of the softcopy images by instructing the workstation to provide the processed electronic image to a selected color printing device. Current advances in color printing technology are helping color document processing systems become more pervasive in desk-top publishing and business applications. Ink jet, thermal-transfer and xerographic color are examples of printing technologies that are making moderate resolution color affordable for these applications. Although more affordable, these printing technologies have some limitations which may surprise and disappoint a user.

Electronic images processed by the workstation consists of a two dimensional array of picture elements (pixels). The color of each pixel may be represented in any of a variety of color notations or color spaces. The colors of softcopy color images are typically defined using a device dependent color classification space such as the additive red, green and blue (RGB) phosphor color space. More specifically, each pixel of the monitor's display contains three primary color phosphors. To generate a color defined by a set of RGB values, the monitor stimulates each primary phosphor with an intensity determined by the corresponding R,G,B value. To be printed, these images need to be converted to the subtractive cyan, magenta, yellow and black (CMYK) or (simply the CMY) color space, which is typically used to put colored dyes, inks, or toners on paper.

Document processing systems typically contains predetermined transform definitions for converting an image defined in one color space to another color space. These transformations are typically defined using a look up table (LUT), that enables a color to be readily mapped from one space to another. Accordingly, the color of each pixel of an electronic image is sequentially mapped using a LUT transform definition to yield a hardcopy representation of a softcopy image. To perform other image transformations that perform functions such as enhance or sharpen a color, the system remaps the color values to yet another point in accordance with another transform definition. Any number of transformations can thus be performed by sequentially mapping color values according to the available predetermined transform definitions.

Transformations used to convert softcopy images to hardcopy images, however, are limited by the color gamuts afforded to softcopy displays and to hardcopy reproduction systems. For example, because of physical limitations of a printing system, such as its resolution, a softcopy of a color image may lose detail when reproduced as a hardcopy. Since the hardcopy reproduction may not have sufficient resolution to reproduce a softcopy image exactly as represented on a color monitor, the printing system may sacrifice appearance detail of a softcopy image in order to preserve its color fidelity. One instance of this limitation is the production of fine lines and text for certain colors. Unlike CRT displays that tend to have many intermediate color shades, most printing technologies are binary in nature, marking with either full ink or none at all. These printing technologies consequently reproduce intermediate shades and tints with a halftone pattern of solid dots. Thus, when a fine line is drawn using such a dot pattern, gaps or stripes in the line may result. For example, small text may have its boundary so disrupted by a halftone dot pattern that the hardcopy rendering of it may be illegible.

Since color printing is performed using a gamut of colors that includes tints and shades of the full color spectrum (e.g. reds, greens, blues and their combinations), printing colored text or fine line graphics on a moderate resolution printing system is difficult for all but a few solid colors. Thus, because of physical device limitations, such as a printing system's resolution, many softcopy color images are inadequately rendered as hardcopy. Specifically, there exists many colors for which lines and text look fine as softcopy on a CRT display but are unacceptable when printed as hardcopy on intermediate resolution printing systems. There exists therefore a need to provide image transformations or mappings that preserve the appearance detail of softcopy images apparent when displayed on color monitors and lost when reproduced as hardcopy on color printing systems. Text, for example, is useless if not legible. Consequently, these transformations should go so far as to sacrifice the color fidelity of the text in order to insure that its appearance detail is preserved.

By way of background, communication protocols between devices such as workstations and printing systems are well known. Some of these protocols define how systems should integrate across networks to provide users with an environment for color document processing. In such an environment communication between devices is transparent to users as a result of the various network protocols that define the manner in which devices exchange information. Specifically, document processing systems can be integrated using Ethernet™ and the Xerox Network Systems Communication Protocols which include: Internet Transport Protocols: Xerox System Integration Standard, Xerox Corp., Stamford, Conn., December 1981, XSIS-028112; Courier: The Remote Procedure Call Protocol, Xerox System Integration Standard, Xerox Corp., Stamford, Conn., December 1981, XSIS-038112; Clearinghouse Protocol, Xerox Corp., Stamford, Conn., April 1984, XSIS-078404; Authentication Protocol, Xerox Corp., Stamford, Conn., April 1984, XSIS-098404; and Filing Protocol, Xerox Corp., Stamford, Conn., May 1986, XNSS-108605.

Also, protocols establishing how to encode electronic documents for transmission between various workstations and printing systems using communications protocols is well known. For example, documents can be encoded using a page description languages (PDL) such as Interpress™ as disclosed in "Interpress™: The Source Book", Simon & Schuster, Inc., New York, N.Y., 1988, by Harrington and Buckley. In combination with Interpress, the Color Encoding Standard, Xerox System Integration Standard, Xerox Corp, Palo Alto, Calif., July 1991, XNSS 289107 ("The Xerox Color Encoding Standard"), provides a standard for interchanging electronic color documents among document applications and devices. The Xerox Color Encoding Standard describes three reference color systems that attempt to provide device independent color between devices such as workstations and printers.

As described above, many factors, such as resolution, affect the true appearance of an image rendered by different physical devices. Consequently, The Xerox Color Encoding Standard, suggests using "appearance hints", in addition to a reference color system. Appearance hints provide additional information when describing a color. In particular, one appearance hint provides an ability to indicate that, when reproducing an image, it is more important to a user that the detail of the image is reproduced than its original color fidelity. It is therefore desirable that color document processing systems detecting such an appearance hint, convert or map the colors of elements forming an image with a method that retains the appearance detail of image elements while maintaining as much of the original color fidelity of the image elements as possible.

All references cited in this specification, and their references, are incorporated by reference herein where appropriate for appropriate teachings of additional or alternative details, features, and/or technical background.

SUMMARY OF THE INVENTION

In accordance with one aspect of the invention there is provided a method for preserving detail of a color image adapted to be reproduced as a halftone pattern. The method includes the steps of identifying an image element forming part of the color image, with the image element having a first color defined by a plurality of colorants, and mapping the first color of the image element identified by said identifying step to a second color that appears solid when reproduced as a halftone so as to preserve detail of the color image.

In accordance with another aspect of the invention there is provided a method for mapping original colors of image elements forming a color image to colors that appear solid when reproduced. The original color and the solid color of an image element being defined by a combination of cyan, magenta and yellow colorants. The method including the step of determining whether the original color of the image element is a light color surrounded by a dark background color, or a dark color surrounded by a light background color. Minimizing the cyan and magenta colorants of each original color in response to the determining step having determined the image element to be a light color surrounded by a dark background color, thereby mapping selected original colors to light solid colors. Maximizing at least one of the cyan or magenta colorants for each color in response to the determining step having determined the image element to be a dark color surrounded by a light background color, thereby mapping selected original colors to dark solid colors.

In accordance with yet another aspect of the invention there is provided an apparatus for mapping original colors of image elements forming a color image to colors that appear solid when reproduced. The original color and the solid color of an image element being defined by a combination of cyan, magenta and yellow colorants. Means are provided for determining whether the original color of the image element is a light color surrounded by a dark background color, or a dark color surrounded by a light background color. Means minimize the cyan and magenta colorants of each original color in response to the determining means having determined the image element to be a light color surrounded by a dark background color, thereby mapping selected original colors to light solid colors. Means maximize at least one of the cyan or magenta colorants for each color in response to the determining step having determined the image element to be a dark color surrounded by a light background color, thereby mapping selected original colors to dark solid colors.

BRIEF DESCRIPTION OF THE DRAWINGS

These and other aspects of the invention will become apparent from the following descriptions, illustrating a preferred embodiment of the invention, read in conjunction with the accompanying drawings wherein the same reference numerals have been applied to like parts and in which.

DETAILED DESCRIPTION

Figure 1:
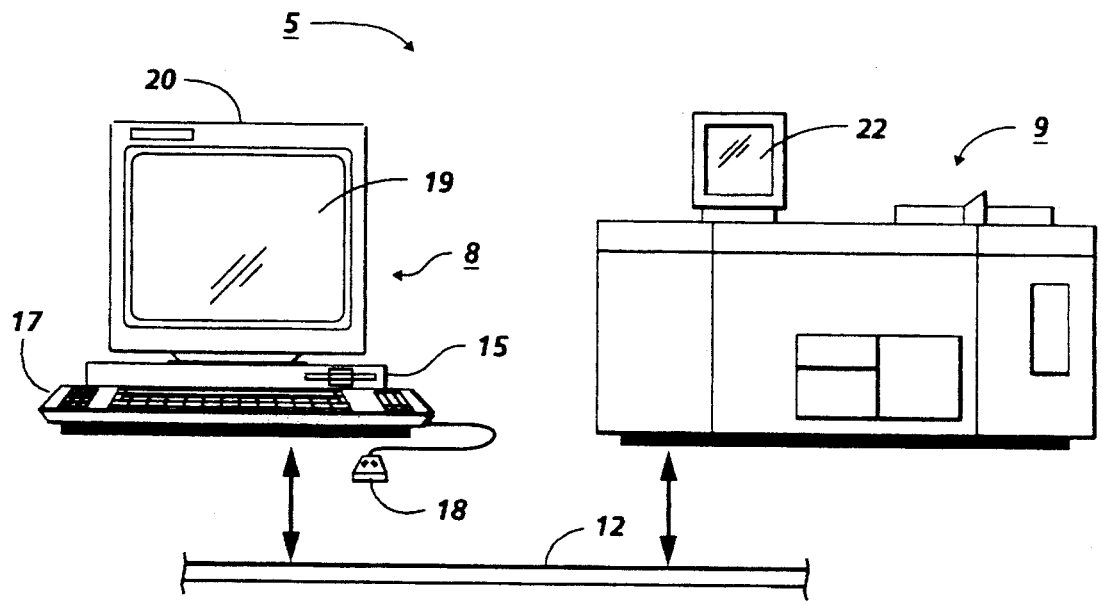
FIG. 1 is a schematic elevational view depicting one example of components of an electronic document processing system with a color printing machine adapted to print electronically encoded documents transmitted from a computer workstation.

With reference now to the drawings where the showings are for the purpose of illustrating a preferred embodiment of the invention and not for limiting same, FIG. 1 shows electronic document processing system 5 incorporating the present invention. The electronic document processing system 5 includes a color computer workstation 8 and a color printing system 9 that are connected with a suitable communication channel such as EtherNet® connection 12. The connection 12 enables image data from one or more remote sources such as workstation 8, to be input to the printing system 9 for hardcopy rendering. The workstation 8 includes a computer system 15 for processing user inputs received from keyboard 17 and pointing device or mouse 18, through user interface 19 displayed on color monitor 20. The user interface 19 collectively represents user inputs through which control instructions are used to develop color electronic images. The color printing system 9, which has its own user interface 22 for monitoring print job requests, is adapted to print hardcopy color image renderings of selected electronic images developed on workstation 8.

Figure 2:
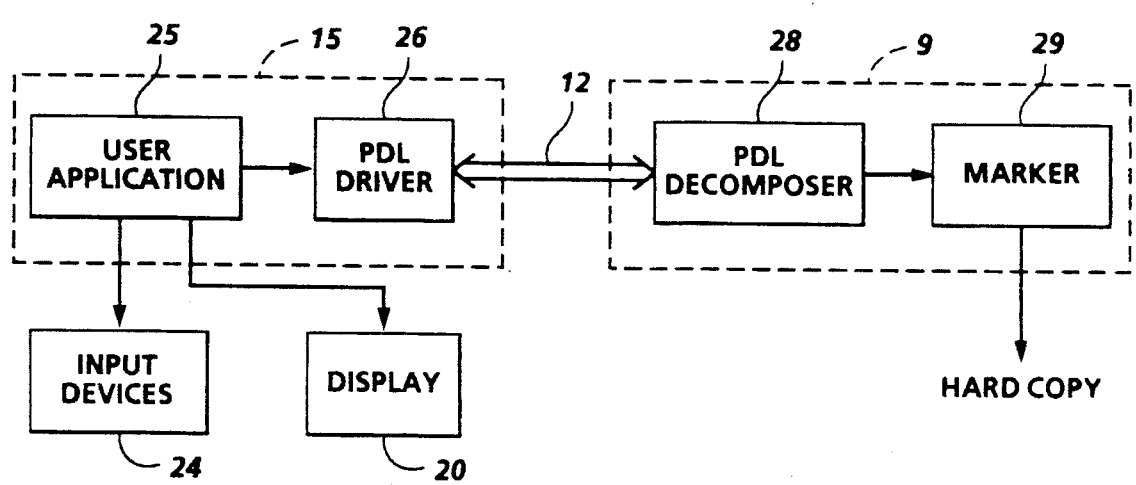
FIG. 2 is a block diagram illustrating the principal elements of the electronic document processing system shown in FIG. 1.

FIG. 2 shows a block diagram representing the basic elements of the electronic processing system 5 shown in FIG. 1 required for carrying out the present invention. In particular, the computer system 15 of workstation 8 executes a conventional graphical user application 25 such as "GlobalView®" developed by the Xerox Corporation. User application 25 provides a high level, device independent graphics software environment for creating, editing and viewing high quality electronic images using two dimensional image elements. Examples of image elements are text in various fonts, lines and curves of various thicknesses, strokes or enclosed outlines and sampled images, all of which can be depicted using various colors that are represented by color reference models as disclosed the Xerox Color Encoding Standard. Image elements are typically a high level description of pixels (picture elements), and unlike pixels, image elements are inherently device independent and are therefore readily transferable between various input and output devices. Additionally, the user application 25 can scale, rotate, translate and clip image elements by specifying an image transformation along with an element. The device independent specification of electronic images by application 25 enables electronic images specified in this manner to be rendered on a variety of output devices such as color printing system 9.

More specifically, image elements forming an input image emitted from PDL driver 26 are defined using high level primitives of a page description language (PDL) such as Interpress used by Xerox® Corporation. Other examples of PDLs are Postscript® ("PS") which is described in "Post-Script® Language Reference Manual", Second Edition, Addison-Wesley Publishing Co., 1990, and Hewlett Packard Printer Control Language ("HP-PCL") which is described in "PCL 5 Printer Language Technical Reference Manual", First Edition, Hewlett Packard Co., 1990. In general, a PDL provides a set of commands that are used to describe various graphic and textual elements forming an image to be printed. For example, a PDL can describe a rectangle in an image by indicating coordinates of its corners, the thickness of its edges, its fill pattern, its color as well as other attributes. The PDL can also be used to include in the input image a raster image or a reference to one or more raster images. The high level primitives describing the input image form a PDL stream of data that is rendered to lower level primitives such as pixels. Each pixel corresponds to a spot which is subsequently marked using an image output terminal such as printing system 9 to form a reproduction of the input image.

Selected input images which are stored in the memory (not shown) of workstation 8 and described using a PDL by user application 25 are transmitted to printing system 9 using print driver 26. Print driver 26 transfers PDL descriptions of electronic document files selected for printing to printing system 9. Once received and stored in the memory (not shown) of printing system 9, PDL descriptions of electronic documents are processed by PDL decomposer 28. The decomposer 28 produces corresponding color bytemapped image files of PDL descriptions of electronic documents that are subsequently rendered on paper or the like by marker 29. A functional implementation of the PDL decomposer 28, is described in detail in U.S. patent application Ser. No. 07/898,761 entitled "Apparatus and Method for Multi-Stage/Multi-Process Decomposing", filed Jun. 12, 1993, by Bonk et al., the pertinent portions of which are incorporated herein by reference. The decomposer 28 executes a PDL stream to generate lower level imaging primitives, and in doing this, the decomposer further parses the PDL stream into various image related components that are further processed by decomposer 28 before output to marker 29. The types of operations required to generate image related components include, among others, binding font calls to bitmap or contour fonts, image processing on pictorial information (such as rotating, enlarging and reducing), and/or conveying line art/graphics to lower level primitives.

Figure 3:
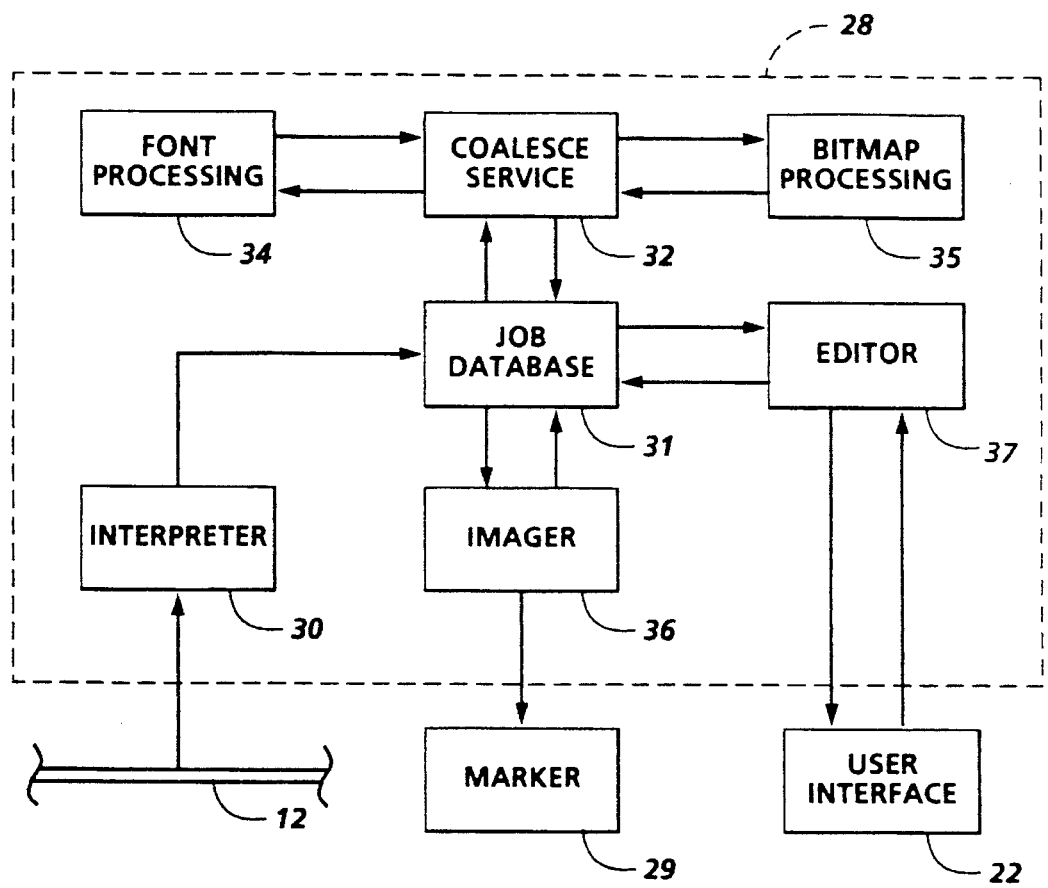
FIG. 3 is a block diagram illustrating the PDL decomposer shown in FIG. 2.

FIG. 3 shows a block diagram representing the major components of PDL decomposer 28. Briefly, decomposition is initiated when a PDL stream of image data is communicated through network connection 12 to the interpreter 30 of decomposer 28 after various elements of printing system 8 are appropriately coordinated. Interpreter 30 then parses the PDL stream into various image related components that are subsequently stored in the job database 31 and later referenced using identifiers. The identifiers of job components are passed from the interpreter 30 to the coalesce service 32 for font processing 34 and bitmap processing 35. Coalesced information is then imaged by imager 36 to bits which are transmitted to marker 29 to be rendered on paper. Additionally, coalesced information in database 31 can be edited using editor 37 through user interface 22 prior to transmission to marker 29.

Figure 4:
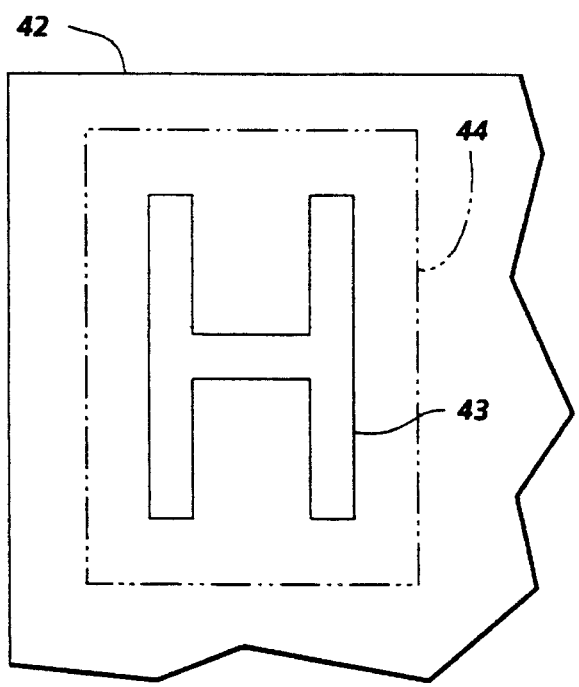
FIG. 4 is one example of a fragment of an image having image elements.

FIG. 4 shows an example of image elements that can be generated electronically using workstation 8. Character 43 and background area 44 are fragments of image 42 that can be represented by high level primitives using a PDL. The image elements have associated with them a set of properties that describe their various attributes. Specifically, the workstation 8 presents the attributes for a character and its background using the text property sheet 50 shown in FIG. 5. For example the character "H" shown in FIG. 4 is described by a font which is specified by a family, a typeface, a size, a weight (e.g. bold) and a stress (e.g. italic). The character "H" and the background 44 of character "H" are also individually described by a color as depicted by "Text Color" and "Background Color" respectively. The text property sheet shown in FIG. 5 enables users creating electronic images to individually specify properties of each image primitive.

Representing a color in a device independent manner between an input and an output devices, such as workstation 8 and printing system 9, using color models is well known and does not form part of the present invention. A number of color reference models or systems have been developed some of which are described in the Xerox Color Encoding Standard. It will be assumed herein that the additive RGB color model used to describe an image element on monitor 20 can be readily encoded using a known reference color model and converted to the CMY subtractive model. For example, the Xerox/RGBLinear color model described in the Xerox Color Encoding Standard can be used to represent the color of image elements developed on workstation 8 for rendering on printing system 9. Specifying the color of a character using the character property sheet shown in FIG. 5 encodes the desired color of an image element using a color reference model.

Figure 5:
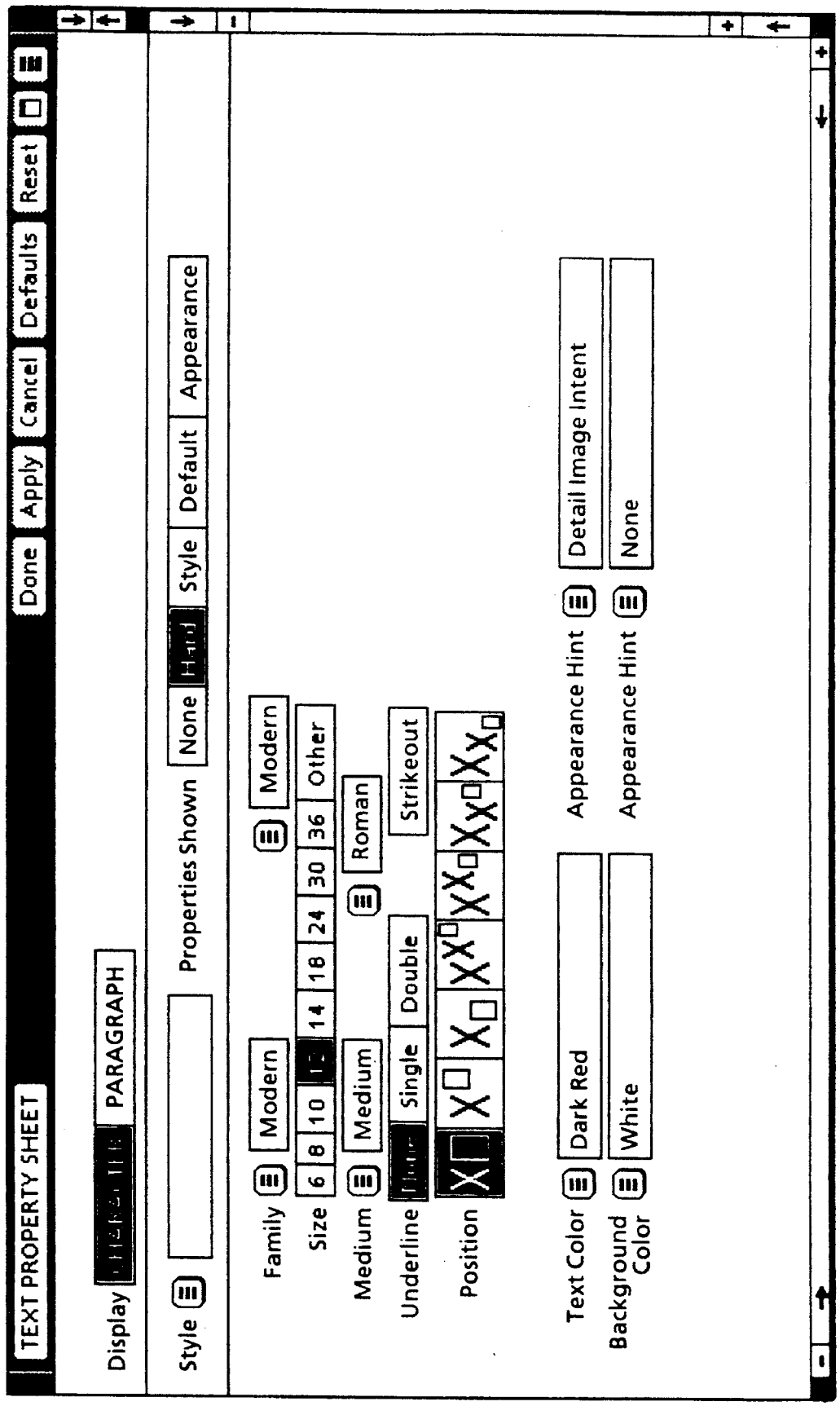
FIG. 5 is one example of a property sheet for the image elements shown in FIG. 4.

The character property sheet shown in FIG. 5 also provides appearance hints for conveying optional information that may be useful in reproducing the specified color of an image element. These appearance hints, which are described in detail in the Xerox Color Encoding Standard, enable users to specify the intent or the nature with which the color of each image element is specified. One such appearance hint is "image intent". For example, by specifying a "pictorial" image intent appearance hint the color of an image element is to appear realistic, while a "functional" image intent appearance hint indicates that an image element should distinguish its color from the color of other image elements. Specifying a "detail" image intent appearance hint, however, indicates that the fidelity of the color of an image element is not critical and that the specified color requires solid area coverage for comprehension. The detail appearance hint indicates that color fidelity can be sacrificed in order to preserve detail of the specified image element. Accordingly, the detail appearance hint is most appropriately used with image elements such as fine line graphics and text for example.

With reference to the present invention, a method of mapping colors is provided that preserve detail of image elements such as fine line graphics and text that have a specified color which may suffer a loss of legibility when rendered on hardcopy by a printer. Depending on the printer, problems can arise when printing colored text and colored line art, since most printers use halftone patterns to create colors. For example, a light color is created by a scattering of small dark colored spots on a white background. For many images the eye integrates the spots and background into a uniform light color, but for text, for example, the scattered spots of a coarse halftone screen result in ragged edges on a character which can render it ugly and unreadable when printed. For readability, text should only be printed in colors which are produced by forming a solid covering of ink. The set of solid colors depends upon the way a printer produces its colors and the gamut of colors it can produce. Some printers may be able to produce a solid form of the desired color while others cannot. It is therefore advantageous to tag colors with the detail image intent appearance hint, described above, to indicate that preserving the detail of an image element is more important than preserving its color fidelity. Thus, although the detail color mapping method provides uniform and very legible image elements, it may sacrifice color fidelity of the image elements.

In response to specifying the detail image intent appearance hint with colored image elements such as text or line art, the printing system 9 produces a solid form of the requested color if it can, otherwise printing system 9 maps the requested color to a different solid color which is close to the originally specified color and that would appear solid when printed. Printing system 9 as like many other printers produces colors with combinations of cyan, magenta and yellow (c,m,y) inks or colorants, where ideally the cyan ink removes red light, the magenta ink removes green light and the yellow ink removes blue light. Thus, to preserve detail of an image element described using (c,m,y) colorants, printing system 9 maps the original color of the image element with at least one primary of the (c,m,y) colorants. This detail mapping method makes the image element appear solid when rendered by printing system 9.

In general, a method of detail color mapping that preserves detail of an image element when printed is specified in accordance with the properties of a printing system and the method with which the printing system generates colors. An image element, such as text, will lose detail only when printed with certain colors; black text, for example, prints with adequate detail; gray text, however, causes difficulties. Similarly, colors such as solid cyan or solid magenta provide high quality lines and characters when printed. Thus, when every pixel forming an image element is set to a relatively dark color, such as black, cyan and magenta, the boundary between the image element and its background becomes clearly defined, making the image element very legible.

In some cases, however, image elements, such as text, printed on a light background need not be limited to pure primary (e.g. cyan and magenta) colors in order for them to be legible. Against a non-cyan background, for example, a character printed in solid cyan with some additional amount of magenta or yellow or black is still quite legible because the cyan colorant provides a crisp, well defined boundary. The presence of other colorants scattered within a character's interior alters its color by making it darker, they do not, however, provide enough contrast variation to harm a character's legibility. Thus, a character printed in solid magenta with any amount of the other colorants provides good legibility. In other words, a dark color, described using cyan, magenta and yellow primaries as (0 ... c ... 1, 0 ... m . . . 1, 0 ... y ... 1), where the amount of each primary is defined from zero to one, is legible when 100% of the cyan (1, m, y) or 100% of the magenta (c, 1, y) component is present in the color.

In contrast, an image element defined using a solid yellow colorant on a light background is not sufficient by itself to provide adequate legibility, since the solid yellow colorant is too light and does not offer enough contrast on a light background. Light colorants such as yellow, therefore, only provide good legibility when seen against a dark background. Also in the case of light colors seen against a dark boundary, the presence of a cyan colorant or a magenta colorant harms legibility of an image element. A light color, described using cyan, magenta and yellow primaries as described above, is legible when some of a color's yellow component is present and its cyan and magenta components are absent (0,0,y). Thus, depending on the color of the image element and its background color, color mapping improves legibility and preserve detail by replacing the image element's original requested color with a legible color that is close to its original color.

To carry out the detail color mapping of the present invention a color image is first created using workstation 8. The color image, which is displayed on monitor 20, is described electronically using image elements, such as text, that are stored in the memory (not shown) of user application 25 shown in FIG. 2. Each image element, such as text, forming the color image has a number of properties that describe the appearance of each image element. For example, some properties of a character are provided by the text property sheet shown in FIG. 5. In particular, the text color appearance hint property provides optional information that describes how a perceived color at the monitor should appear when printed, in the event a printer may not be able to reproduce a specified color without altering the intended appearance (e.g. the legibility) of the text. In specifying the detailed image intent appearance hint for an image element such as text, a printing system upon recognition of the hint will alter, using the detail color mapping of the present invention, the originally selected color of the text (e.g. dark red) to another color that is close to the originally selected color to preserve the legibility of the text when printed. The originally selected color of the text, therefore, is not altered if the printing system is capable of reproducing that color while preserving image detail even though a detail image intent appearance hint is specified.

Once the color image is fully characterized by user application 25 using image elements such as text, line art and bitmaps, the image is encoded using image primitives of a PDL such as Interpress and transmitted to printing system 9 with print driver 26 to PDL decomposer 28 through connection 12 for hardcopy rendering on marker 29 as shown in FIG. 2. Upon receipt, the interpreter 30 of PDL decomposer 28 parses the image primitives of the PDL stream arriving through connection 12 as shown in FIG. 3. Each image primitive is stored in job database 31 before being imaged to bits by imager 36. Some of the image primitives parsed are defined with appearance hints and upon detection of a detail image intent appearance hint, interpreter 60 alters the original color using the detailed color mapping method shown in FIG. 6.

Figure 6:
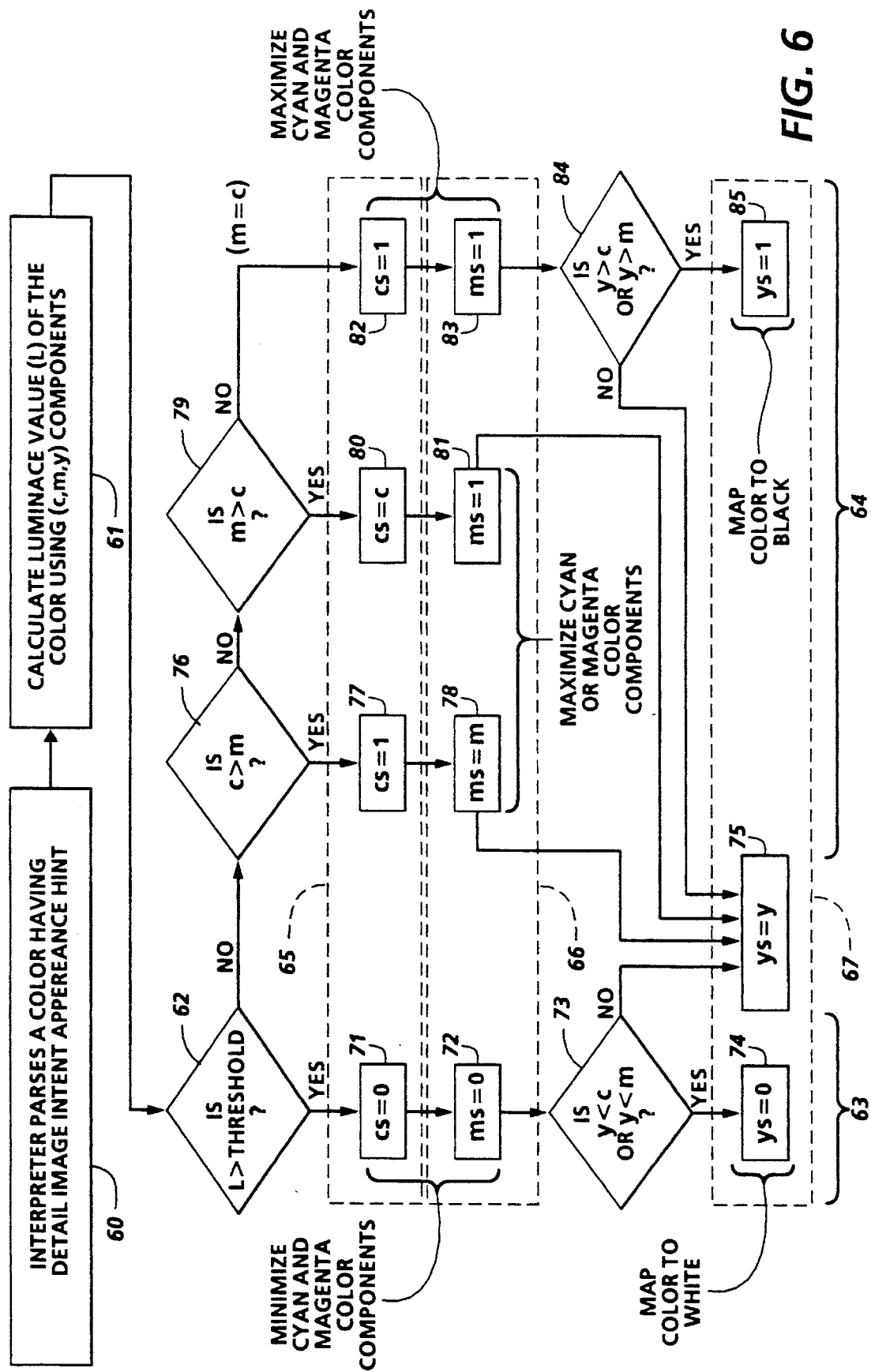
FIG. 6 is a flow diagram of the method for detail color mapping using cyan, magenta and yellow colorants (c,m,y) in accordance with the present invention.

A detail method of color mapping using cyan, magenta and yellow colorants (c,m,y) is shown in the flow diagram in FIG. 6. To invoke the color mapping sequence shown in FIG. 6 an image primitive specifying its color using a color model operator that includes a detail image intent appearance hint of an image element is parsed by interpreter 30 at step 60. First the interpreter determines whether to treat the (c,m,y) colorants describing an image element as a dark image element on a light background or a light image element on a dark background. When the background colors of an image element are unknown, a measure of the brightness of the image element's colors, such as luminance, is used to predict whether the background colors of the image element are dark or light at step 61. The luminance value L determined at step 61, which is defined in terms of the three primary colorants (c,m,y), is compared to a threshold value T at step 62 to determine the relative brightness of the image element. In one embodiment a luminance value defined by the equation $L=[1.0-(c/4)-(m*11/16)-(y/16)]$ is compared to a threshold value of $T=0.875$ which is behaviorally consistent with the solid named colors in the Xerox Color Encoding Standard. Thus at step 62, if the luminance value L is above the threshold value T (e.g. L>T) then the image element is considered to be a light image element on a dark background in section 63. Otherwise the image element is considered to be a dark image element on a light background in section 64.

In general, the colorants (c,m,y) defining a color of an image element are mapped to a solid color as defined by the colorants (cs,ms,ys) in sections 65, 66 and 67 respectively, as shown in FIG. 6, in order to preserve the original detail (e.g. legibility) of the image element. Accordingly, each of the (cs,ms,ys) colorants of a color are either minimized according to section 63 or maximized according to section 64. Specifically, when the luminance value L of a color of an image element is above the threshold value T, the (cs, ms,ys) colorants are minimized according to section 63 at steps 71 through 75. At steps 71 and 72 detail of light colors having dark backgrounds are preserved by minimizing the cyan (e.g. cs=0) and magenta (e.g. ms=0) components, respectively. The yellow component (ys), however, can by retained without adversely affecting the original detail of the an image element, if the original color is mostly yellow, otherwise the color shifts resulting from the mapping are too severe making it more effective to simply map the color to white. Step 73 determines whether the original color is not primarily yellow by checking whether the yellow component is less than the cyan component or the magenta component of the original color. Accordingly, at step 74 the yellow component is removed (e.g. ys=0) having found the original color not to be primarily yellow, and conversely, having found the original color to be primarily yellow, the original yellowness is retained at step 75 (e.g. ys=y).

In the case the luminance value L of a color of an image element is equal to or below the threshold value T, the (cs,ms,ys) colorants are maximized according to section 64 at steps 75 through 85. At steps 76 if the cyan component of the original color is stronger than the magenta component of the original color then the cyan component is made solid or maximized at step 77 while the magenta and yellow components retain their original component value at steps 78 and 75 respectively. Similarly at step 79, if the magenta component is stronger than the cyan component then the magenta component is made solid or maximized at step 81 while the cyan and yellow components retain their original component value at steps 80 and 75, respectively. In the case the original cyan and magenta components are equal both the cyan and magenta components are made solid or maximized at steps 82 and 83, respectively. In addition, if the yellow component is determined to be the strongest of balanced or equal cyan and magenta components at step 84 then the original color is mapped to black at step 85 so that excessive hue shifts are avoided otherwise the yellow component retains is original component value at steps 75. The resulting new color (cs,ms,ys) of image elements appears solid when printed by printing system 9.

The mapped color defined by the color components (cs,ms,ys) defines the color that the interpreter 30 stores in the job database 31 shown in FIG. 3. Once a PDL stream of image data has been parsed by interpreter 30, and the PDL stream's image components have been stored and referenced using identifiers in job database 31. The identifiers of job components are passed from the interpreter 30 to the coalesce service 32 for font processing 34 and bitmap processing 35. Coalesced information is then imaged by imager 36 to bits which are transmitted to marker 29 to be rendered on paper.

It will no doubt be appreciated that in a printing architecture as described above which separates the processing into a page description language decomposition stage (e.g. interpreter 30 and coalesce service 32) and an imaging stage (e.g. imager 36), colors of image elements are usually found at the interface between these two stages. Accordingly, in an alternate embodiment the color mapping may be carried out in the imager 36. What is required by the present invention, however, is that originally specified colors of image elements, such as text, are mapped to a solid color so that the image elements retain their legibility when printed. However, since this detail color mapping may cause extreme color shifts of image elements, the mapping should be reserved for occasions when the legibility of image elements are more important to the user than the true color fidelity of the image elements. Also, invocation of the detail color mapping depends upon the interface between the user's application and the printing system. Thus, in alternate embodiments there may exist no a priori way of determining whether or not the color mapping is desirable (e.g. appearance hints), and consequently a printer may be configured such that all color text is detail color mapped by default.

It will also no doubt be appreciated that the detail mapping method of the present invention is not limited mapping colors defined using combinations of cyan, magenta and yellow (c,m,y) primaries. Other colors defined using primaries such as red, green and blue (r,g,b) can be readily mapped according to the method disclosed in FIG. 6 simply by taking the compliments of the cyan, magenta and yellow primaries respectively (e.g. c=1-r, m=1-g, y=1-b).

The disclosed method of detail color mapping may be readily implemented in software using object oriented software development environments that provide portable source code that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. A method for mapping original colors of image elements forming a color image to colors that appear solid when reproduced, with the original color and the solid color of an image element being defined by a combination of cyan, magenta and yellow colorants, comprising the steps of:

determining whether the original color of the image element is a light color surrounded by a dark background color, or a dark color surrounded by a light background color;

minimizing the cyan and magenta colorants of each original color in response to said determining step having determined the image element to be a light color surrounded by a dark background color, said minimizing step mapping selected original colors to light solid colors by setting at least one of the cyan or magenta colorants to a minimum possible value; and maximizing at least one of the cyan or magenta colorants for each color in response to said determining step having determined the image element to be a dark color surrounded by a light background color, said maximizing step mapping selected original colors to dark solid colors by setting the at least one of the cyan or magenta colorants to a maximum possible value.

2. The method according to claim 1, further comprising the step of reproducing the image element with a color printer in accordance with the solid color defined by said minimizing or said maximizing steps to preserve appearance detail of the image element when reproduced.

3. The method according to claim 1, further comprising the step of performing said determining step for each image element having an appearance hint, the appearance hint indicating that the original color of an image element can be altered in order that the detail of the image element is preserved during said reproducing step.

4. The method according to claim 3, further comprising the step of enabling the appearance hint for an image element from a user interface.

5. The method according to claim 1, wherein said determining step comprises the steps of:

calculating a luminance value for each image element; and comparing the luminance value with a threshold value, said comparing step providing a control signal indicative of whether the luminance of each image element is less than or greater than the threshold value.

6. The method according to claim 1, wherein said minimizing step further comprises the step of minimizing the yellow colorant of each image element when the original yellow colorant is less than either the original cyan or the original magenta colorants, said minimizing step mapping the original color to white.

7. The method according to claim 1, wherein said maximizing step further comprises the step of maximizing both the cyan and magenta colorants defining each image element when the original cyan and magenta colorants are equal.

8. The method according to claim 7, wherein said maximizing step further comprises maximizing the yellow colorant of each image element when the original yellow colorant is greater than either the original cyan or the original magenta colorants, said maximizing step mapping the original color to black.

9. The method according to claim 1, further comprising the step of performing said minimizing and said maximizing steps in response to the original color being defined by a mixture of red, green and blue colorants that are defined according the following combination of cyan, magenta and yellow colorants:

red=1-cyan;

green=1-magenta; and blue=1-yellow.

10. An apparatus for mapping original colors of image elements forming a color image to colors that appear solid when reproduced, with the original color and the solid color of an image element being defined by a combination of cyan, magenta and yellow colorants, comprising:

means for determining whether the original color of the image element is a light color surrounded by a dark background color, or a dark color surrounded by a light background color;

means for minimizing the cyan and magenta colorants of each original color in response to said determining means having determined the image element to be a light color surrounded by a dark background color, said minimizing means mapping selected original colors to light solid colors by setting at least one of the cyan or magenta colorants to a minimum possible value; and means for maximizing at least one of the cyan or magenta colorants for each color in response to said determining means having determined the image element to be a dark color surrounded by a light background color, said maximizing means mapping selected original colors to dark solid colors by setting the at least one of the cyan or magenta colorants to a maximum possible value.

11. The apparatus of claim 10, further comprising a color printer for reproducing the image element in accordance with the solid color defined by said minimizing or said maximizing means to preserve appearance detail of the image element when reproduced.

12. The apparatus of claim 10, further comprising means for inputting an appearance hint for each image element, with the appearance hint indicating that a color of an element should be mapped according to said minimizing and maximizing means.

13. The apparatus of claim 12, wherein said inputting means comprises a user interface.

14. The apparatus of claim 10, wherein said determining means comprises:

means for calculating a luminance value for each image element; and means for comparing the luminance value with a threshold value, said comparing means providing a control signal indicative of whether the luminance of each image element is less than or greater than the threshold value.

15. The apparatus of claim 10, wherein said minimizing means minimizes the yellow colorant of each image element when the original yellow colorant is less than either the original cyan or the original magenta colorants, said minimizing means mapping the original color to white.

16. The apparatus of claim 10, wherein said maximizing means maximizes both the cyan and magenta colorants defining each image element when the original cyan and magenta colorants are equal.

17. The apparatus of claim 16, wherein said maximizing means maximizes the yellow colorant of each image element when the original yellow colorant is greater than either the original cyan or the original magenta colorants, said maximizing means mapping the original color to black.

18. A method for preserving detail of a color image adapted to be reproduced as a halftone pattern, comprising the steps of:

identifying an image element forming part of the color image, with the image element having a first color defined by a plurality of colorants;

mapping the first color of the image element identified by said identifying step to a second color that appears solid when reproduced as a halftone so as to preserve detail of the color image; and where said mapping step comprising the step of minimizing one colorant of the first color.

19. The method according to claim 18, further comprising the step of reproducing the image element on a printer in accordance with the second color determined by said mapping step.

20. The method according to claim 19, further comprising the step of providing an appearance hint to indicate that the original color of the image element can be altered to preserve the detail of the image element during said reproducing step.

21. A method for preserving detail of a color image adapted to be reproduced as a halftone pattern, comprising the steps of:

Identifying an image element forming part of the color image, with the image element having a first color defined by a plurality of colorants;

Mapping the first color of the image element identified by said identifying step to a second color that appears solid when reproduced as a halftone so as to preserve detail of the color image; and Where said mapping step comprises the step of maximizing one colorant of the first color.

* * * * *